United States Patent
Keating et al.

(10) Patent No.: US 11,785,142 B2
(45) Date of Patent: Oct. 10, 2023

(54) INFORMATION BRIDGE DEVICE AND SYSTEM, A COMMUNICATION SYSTEM COMPRISING AN INFORMATION BRIDGE DEVICE OR SYSTEM, A METHOD OF INFORMATION BRIDGING, USE OF A USER INTERFACE AND A SOFTWARE PRODUCT

(71) Applicant: WEBTEXT HOLDINGS LIMITED, Dublin (IE)

(72) Inventors: Colm Keating, Sandycove (IE); Aj Cahill, Salthill (IE); Carl Fleming, Dublin (IE); Eoghan Moylan, Barna (IE); Garrett Jordan, Galway (IE)

(73) Assignee: WEBTEXT HOLDINGS LIMITED, Dublin (IE)

( * ) Notice: Subject to any disclaimer, the term of this patent is extended or adjusted under 35 U.S.C. 154(b) by 0 days.

(21) Appl. No.: 16/485,348

(22) PCT Filed: Dec. 11, 2017

(86) PCT No.: PCT/IB2017/057783
§ 371 (c)(1),
(2) Date: Aug. 12, 2019

(87) PCT Pub. No.: WO2018/150241
PCT Pub. Date: Aug. 23, 2018

(65) Prior Publication Data
US 2019/0379789 A1     Dec. 12, 2019

(30) Foreign Application Priority Data
Feb. 14, 2017   (EP) ..................................... 17156154

(51) Int. Cl.
*H04M 3/51*    (2006.01)
*H04M 3/523*   (2006.01)
*H04L 51/56*   (2022.01)

(52) U.S. Cl.
CPC .......... *H04M 3/5141* (2013.01); *H04L 51/56* (2022.05); *H04M 3/5238* (2013.01)

(58) Field of Classification Search
None
See application file for complete search history.

(56) References Cited

U.S. PATENT DOCUMENTS

| 9,369,433 B1* | 6/2016 | Paul ...................... G06F 21/572 |
| 2011/0047246 A1* | 2/2011 | Frissora .................. H04L 67/24 |
| | | 709/219 |

(Continued)

FOREIGN PATENT DOCUMENTS

| CA | 2827198 A1 | 3/2014 |
| WO | 2015134818 A1 | 9/2015 |
| WO | 2017158558 A1 | 9/2017 |

OTHER PUBLICATIONS

International Search Report and Written Opinion in PCT/IB2017/057783 dated Feb. 23, 2018, 14 pages.

(Continued)

*Primary Examiner* — Saumit Shah
(74) *Attorney, Agent, or Firm* — Pearne & Gordon LLP

(57) ABSTRACT

An information bridge device, IBD (10, 20), comprising: —an API interface (application programming interface) (300) comprising: —an API input (301), for receipt of user input or request via an application (APP) (30) arranged located on a user device (1100) associated with a user (1000), and, an API output (302), for facilitating transfer of data (300F) relating to at least one Enterprise (2000) to the application (APP) (30), the information bridge device further comprising: —a metadata store (310), for storing metadata specific to the at least one Enterprise (2000), said metadata comprising, access information arranged to facilitate access to the at least one Enterprise (Continued)

(2000) by the information bridge device (IBD) (1020), an Enterprise data collector (330), arranged capable of receiving or collecting (300G 300H) Enterprise data from at least one contact option (2100) arranged in association with the at least one Enterprise (2000), and further arranged in co-operation with the metadata store (310) for identification of the at least one Enterprise (2000) and receipt of metadata comprising access information associated with the at least one contact option (2100) to facilitate collection, and, an Enterprise data store (320), arranged to store said Enterprise data obtained by the Enterprise data collector (330), and further arranged co-operative (300E) with the API output (302) of the API interface (300) for Enterprise data transfer to the application (APP) (30) on the user device (1 100). An information bridge system, a communication system, a method of information bridging and use of a user interface and software product for implementation of the information bridging method.

22 Claims, 12 Drawing Sheets

(56) References Cited

U.S. PATENT DOCUMENTS

| | | | |
|---|---|---|---|
| 2014/0089490 A1* | 3/2014 | Kunisetty | G06F 9/541 709/224 |
| 2014/0257914 A1 | 9/2014 | Caiman et al. | |
| 2015/0056964 A1 | 2/2015 | Williams et al. | |
| 2016/0127454 A1* | 5/2016 | Maheshwari | H04L 41/0803 709/223 |
| 2017/0126692 A1* | 5/2017 | Stuntebeck | H04L 63/08 |
| 2017/0272504 A1 | 9/2017 | Cahill et al. | |
| 2018/0309751 A1* | 10/2018 | Mistry | H04L 63/123 |
| 2020/0334304 A1* | 10/2020 | Reddy Vennapusa | G06F 16/2379 |

OTHER PUBLICATIONS

European Search Report issued in European Patent Application No. 17156154.1 dated Jun. 13, 2017, 14 pages.

* cited by examiner

INFORMATION BRIDGE DEVICE AND SYSTEM, A COMMUNICATION SYSTEM COMPRISING AN INFORMATION BRIDGE DEVICE OR SYSTEM, A METHOD OF INFORMATION BRIDGING, USE OF A USER INTERFACE AND A SOFTWARE PRODUCT

FIELD OF THE INVENTION

The present invention relates to an Information Bridge Device (IBD) device for collecting information from Enterprises and arranged capable of interaction with user devices in the field of messaging and communications, specifically in the field of communication between mobile devices and Enterprise systems. The present invention further relates to an information bridge system (IBD system) comprising such a device. The present invention further relates to a communication system comprising an IBD or IBD system. In addition, the present invention relates to a method of operating such a device or system and to use of a user interface facilitating a least one step of the method. Further, the invention relates to a software product arranged capable of implementation of the method.

BACKGROUND OF THE INVENTION

In the field of messaging and communications, many devices and applications are available to facilitate various forms of messaging and information exchange. The development and capabilities of devices and methods have rapidly expanded based on the accessibility and use of the world wide web and internet and the implementation of standardised communication protocols, such as HTTP, HTTPS, XMPP, SMPP, TCP/IP etc. The development of mobile devices, such as smart phones, has allowed information of many types to be available to a user by means of a single multi-functional device, conveniently and without being reliant on a location based, specific system or device. The user has great flexibility in the choice of communication methods available, such as email, chat services, voice call and SMS or text. In addition, web browsing and other forms of information exchange are facilitated.

Enterprises, including (but not limited to) examples such as businesses, government organisations, clubs, social networks, call centres etc. have reacted to the changing technologies by ensuring their presence and availability to a user in a variety of ways, including various communication options. Enterprises frequently provide chat services, voice call services, email capability, social media presence e.g. Facebook and Twitter accounts, dedicated websites or web portals, in order to interact with the user. Indeed, the public at large now anticipate at least one or more of such services to be present by default and the Enterprise gains advantage by providing a plurality of communication options. In the context of this application, we refer to Enterprises, (defined according to common usage) as businesses or companies or other related entrepreneurial activities. For example, SME's (small to medium sized enterprises) are generally referred to a small to medium sized enterprises, dependent on the company size or business financial turnover. Enterprises may also be considered as any group or organization providing services to customers, with whom it may wish to communicate through a variety of disparate channels or communication types. In particular, this communication may comprise automated messaging, person-to-person messaging, or a combination of the two.

Provision of such a broad range of services and communication possibilities does present difficulties, however, not only to the Enterprise but also to the user. In order to access a dedicated website belonging to an Enterprise, the user must access an application (APP) present on whatever device is available to them e.g. a mobile device or computer. The user device normally comprises an application programming interface (API) with which the APP is co-operative. In another common arrangement, the APP may poll directly, for information or contact or connection with other devices outside the environment of the user device, such that the APP is in direct contact with the outside world beyond the user device. The APP then facilitates particular functionality, often associated with a particular Enterprise. Examples of APP's for web browsing include, for example, Safari or Explorer. Frequently, the user will want to use a mobile device, such as a smart phone, so as to collect information as easily as possible, on the move, or to retain everything on one device, which is usually present with them. In order to access a different kind of information, such as a Facebook account of the Enterprise, the user must have a Facebook application (Facebook APP) installed on their mobile device. Most mobile devices comprise capability or applications (APP's) for various forms of direct communication, such as text messaging (e.g. SMS, MMS, Messenger) or web chat or voice call. Most Enterprises will have similar provisions at their side to allow interaction. In some cases, the Enterprises comprise contact centres, which facilitate different links of communication with options for chat, messaging and/or email. A provision for call back to a user if the Enterprise is busy, is frequently a further option.

FIG. 10 is a schematic illustration of a plurality of interactions, effected between at least one user 1000 and at least one Enterprise 2000, according to the state of the art. The user 1000 is shown as utilising a single mobile device 1100 comprising four applications (APP's) 1200 1300 1400 1500. APP 1200 is shown here as an Enterprise dedicated APP, while email 1300, SMS 1400 and voice call 1500 APP's or facilities are present on this mobile device (e.g. a smart phone) as standard. The Enterprise 2000 comprises a plurality of contact options 2100 for the user, namely a dedicated APP 2200, a webportal 2300, a Contact Centre 2400 here embedded in the Enterprise itself and a phone line 2500. Arrows 3000 illustrate possible interactions between the user and the Enterprise under these conditions. The figure depicts one potential situation only for the purposes of illustration and should not be considered as limiting, as more than one user or Enterprise could be present, the Enterprise might provide only one contact option 2100, a different type of device could be used by the user and the number of APP's is not restricted—a single APP could be present on the device. Different kinds of APP may be present. Similarly, more than one Enterprise could be present, different functionalities or APP's belonging to different Enterprises.

It should be noted that while the user has many options for interacting with different parts of the Enterprise according to the functionality provided, each interaction may require a separate connection to the Enterprise. While an Enterprise contact centre 2400 can facilitate user interaction 3000A 3000B 3000C by email 1300, SMS 1400 or voice call 1500, an independent communication means and separate connection is needed at the user side. In order to connect user 1000 and Enterprise 2000 by means of the dedicated APP 1200 2200, respectively, a completely independent interaction 3000D is required. Traditional contact by phone or voice call is indicated by arrow 3000E.

The mutual and dual provision of applications APP's (or application programming interfaces API's) and functionality between the user and the Enterprise affords the possibility for mutual interaction. However, this is not the whole story. The APP's of e.g. the user, such as text messaging capability, often rely on the provisions of another party, such as a messaging service or platform to which the user is subscribed. Different platforms comprise different characteristics and processes. The use of intermediary services, such as artificial intelligence (AI), virtual agents, or automated 'bot' services, may also be present at the side of the Enterprise. Said intermediary services provide access to 'static' information, such as account type or account balances (i.e. reference-type information), or provide 'intelligent' information, allowing a 'human-like' dialogue for certain interaction types. A Contact Centre associated with the Enterprise may also be provided by a third party, with no access to Enterprise business systems and information. Well known Contact Centre system functionalities are provided, for example, by Cisco, Avaya, Genesys, Salesforce, Oracle, Liveperson. Not all contact centre systems provide the same functionality—some may not comprise messaging, for example. Dedicated APP's may be required for use. Thus, while the user—Enterprise interaction may be direct, it may also be very complex with many stakeholders in the chain. The chain can also be linked, either completely or in part, by various mutual interactions or associations, including protective security measures, for example.

A problem associated with the current communication and interaction between user and Enterprise may be illustrated by considering the issues faced by a user in choosing the most appropriate or effective way to access the Enterprise. With reference to FIG. 10, consider the options available to user 1000 who is in contact with a Contact Centre 2400 associated with an Enterprise. The user may have the option to connect live with the Contact Centre 2400 by means of SMS 1400 or voice call 1500 but in order to do so a choice must be made at the outset between the two mechanisms facilitating interaction indicated by arrows 3000B 3000C. Connection by means of voice call 3000C may result in the user being placed in a queue with a waiting time of e.g. several minutes before actual connection is made to the Contact Centre. Similarly, SMS interaction 3000B may have a delay in response or be available only at certain times. Unfortunately for the user, until a preferred contact method is chosen, it is impossible to know what delays or restrictions the interaction with the Enterprise may be subjected to. The user must try different methods, rejecting one if the wait time is unacceptably long, for example.

A problem facing the user is that it is not possible to anticipate which interaction method would be optimum. The user must individually connect to each Enterprise option or contact point for information—this is complicated, time consuming, may involve use of non-standard communications between different options and incurs time lags.

SUMMARY OF THE INVENTION

The present invention seeks to provide an improved user experience by facilitating optimised access to various Enterprises.

According to a first aspect of the present invention, there is provided an information bridge device (IBD), as claimed in appended claim 1: there is provided an information bridge device, comprising:— an API interface (application programming interface) comprising:—
   an API input, for receipt of user input or request via an application (APP) arranged located on a user device associated with a user, and,
   an API output, for facilitating transfer of data relating to at least one Enterprise to the application (APP),
the information bridge device further comprising:—
a metadata store, for storing metadata specific to the at least one Enterprise, said metadata comprising, access information arranged to facilitate access to the at least one Enterprise by the information bridge device (IBD),
an Enterprise data collector, arranged capable of receiving or collecting Enterprise data from at least one contact option arranged in association with the at least one Enterprise, and further arranged in co-operation with the metadata store for identification of the at least one Enterprise and receipt of metadata comprising access information associated with the at least one contact option to facilitate collection, and,
an Enterprise data store, arranged to store said Enterprise data obtained by the Enterprise data collector, and further arranged co-operative with the API output of the API interface for Enterprise data transfer to the application (APP) on the user device.

The invention is of advantage in that it provides a streamlined process and access to at least one Enterprise (or optionally, a plurality of Enterprises), making improvement in the user experience and facilitating access to Enterprise data, which allows a simultaneous assessment of collected information from different contact options.

Further advantages of the various embodiments of the present invention also include:
   retrieval of information from multiple contact vendors, which run contact centre platforms from a multitude of vendors;
   normalisation and provision of this information in a common format via purpose designed APP;
   facilitation of two-way chat to disparate enterprise chat systems, using a single universal APP;
   facilitation of access to a single point of contact, whereby access to the described plurality of communication channels and Enterprise data sources can be gained via the purpose-designed, dedicated application (APP).

Optionally, the information bridge device further comprises that:
the Enterprise data collector is arranged to drive collection of Enterprise data;
AND/OR arranged to transfer the collected Enterprise data to refresh the Enterprise data store;
AND/OR, prompt output of Enterprise data by means of the API Interface or API output to the application (APP).

Optionally, the information bridge device further comprises that:
the Enterprise data collector is arranged to collect at a specific time or requested time interval or, preferably, at a predetermined interval or rate.

Optionally, the information bridge device further comprises that:
the stored metadata in the metadata store comprises at least one URL for connection to the at least one Enterprise OR a list of a plurality of Enterprises and the metadata associated with each Enterprise OR at least one contact option.

Optionally, the information bridge device further comprises that:
the metadata store is further arranged in co-operation with the API interface, for data transfer of metadata to the application (APP).

Optionally, the information bridge device further comprises that:
data transferred to application (APP) comprises metadata OR Enterprise data.

Optionally, the information bridge device further comprises that:
the API interface further comprises an API input, arranged capable of receiving an optional request from the at least one application (APP), for the purposes of requesting metadata OR Enterprise data.

Optionally, the information bridge device further comprises that:
the metadata store comprises a programmable metadata store, PMS.

According to a second aspect of the invention, as claimed in appended claim 9, there is provided an information bridge system. The information bridge system comprises an information bridge device, IBD, with a programmable metadata store. The information bridge system further comprises an Admin control arranged in co-operation with an Admin interface, said Admin interface being arranged located on the information bridge device and further arranged in co-operation with the PMS, such that the Admin control is arranged capable of amending or updating the metadata comprised in the programmable metadata store (PMS) by means of the Admin interface.

Optionally, the information bridge device, or information bridge system, is arranged in association with:
a messaging platform arranged to facilitate access to the at least one application (APP), arranged located on a user device associated with a user, AND/OR;
an integration platform arranged to facilitate access to the at least one contact option arranged in association with the at least one Enterprise.

According to a third aspect of the invention, as claimed in appended claim 11, there is provided a communication system comprising an information bridge device or an information bridge device system.

According to a fourth aspect of the invention, as claimed in appended claim 12, there is provided use of a user interface, comprised in the user device, when the user interface is arranged to receive OR interpret OR display Enterprise data OR metadata, obtained according to any of the methods according to the fifth aspect of the invention, preferably the user device comprising a mobile device.

According to a fifth aspect of the invention, as claimed in appended claim 13, there is provided a method of information bridging, comprising the steps of:
transferring data relating to at least one Enterprise to an application (APP), arranged located on a user device, by means of an API interface (application programming interface) located on an information bridging device (IBD) and comprising an API input for receipt of user input or request via the application (APP) and an API output for facilitating transfer of data relating to the at least one Enterprise;
storing metadata specific to the at least one Enterprise in a metadata store comprised in the IBD, said metadata comprising, access information arranged to facilitate access to the Enterprise by the information bridge (IBD);
arranging an Enterprise data collector, comprised in the IBD, capable of receiving or collecting Enterprise data from at least one contact option arranged in association with the at least one Enterprise, and further arranging said Enterprise data collector in co-operation with the metadata store for identification of the at least one Enterprise and receipt of metadata comprising access information associated with the at least one contact option to facilitate collection; and,
arranging an Enterprise data store, comprised in the IBD, to store said Enterprise data obtained by the Enterprise data collector, and further arranged co-operative with the API output of the API interface for Enterprise data transfer to the application (APP) on the user device.

Optionally, the method further comprises the steps of:
arranging the Enterprise data collector to drive collection of Enterprise data, AND/OR arranged to transfer the collected Enterprise data to refresh the Enterprise data store AND/OR, prompt output of Enterprise data by means of the API Interface or API output to the application (APP); AND/OR,
arranging the Enterprise data collector to collect at a specific time or requested time interval or, preferably, at a predetermined interval or rate; AND/OR,
arranging the stored metadata to comprise at least one URL for connection to the at least one Enterprise OR a list of a plurality of Enterprises and the metadata associated with each Enterprise OR at least one contact option; AND/OR,
further arranging the metadata store in co-operation with the API interface, for data transfer of metadata to the application (APP), optionally, further arranging the data transferred to application (APP) to comprise metadata or Enterprise data; AND/OR,
arranging the API interface to further comprise an API input, arranged capable of receiving an optional request from the at least one application (APP), for the purposes of requesting metadata OR Enterprise data; AND/OR,
arranging the metadata store to comprise a programmable metadata store, PMS.

Optionally, when the metadata store is arranged to comprise a programmable metadata store PMS, the method further comprises the step of:
providing an information bridge system comprising an information bridge device IBD and further comprising an Admin control arranged in co-operation with an Admin interface, said Admin interface being arranged located on the information bridge device and further arranged in co-operation with the PMS, such that the Admin control is arranged capable of amending or updating the metadata comprised in the PMS by means of the Admin interface.

According to a sixth aspect of the present invention, as claimed in appended claim 16, there is provided a software product recorded on machine readable data storage media, characterized in that the software product is executable upon computing hardware for implementing a method pursuant to the fifth aspect of the invention.

It will be appreciated that features of the invention are susceptible to being combined in any combination without departing from the scope of the invention as defined by the appended claims.

DESCRIPTION OF THE FIGURES

Embodiments of the present invention will now be described, by way of example only, with reference to the following diagrams wherein.

Figure 1:
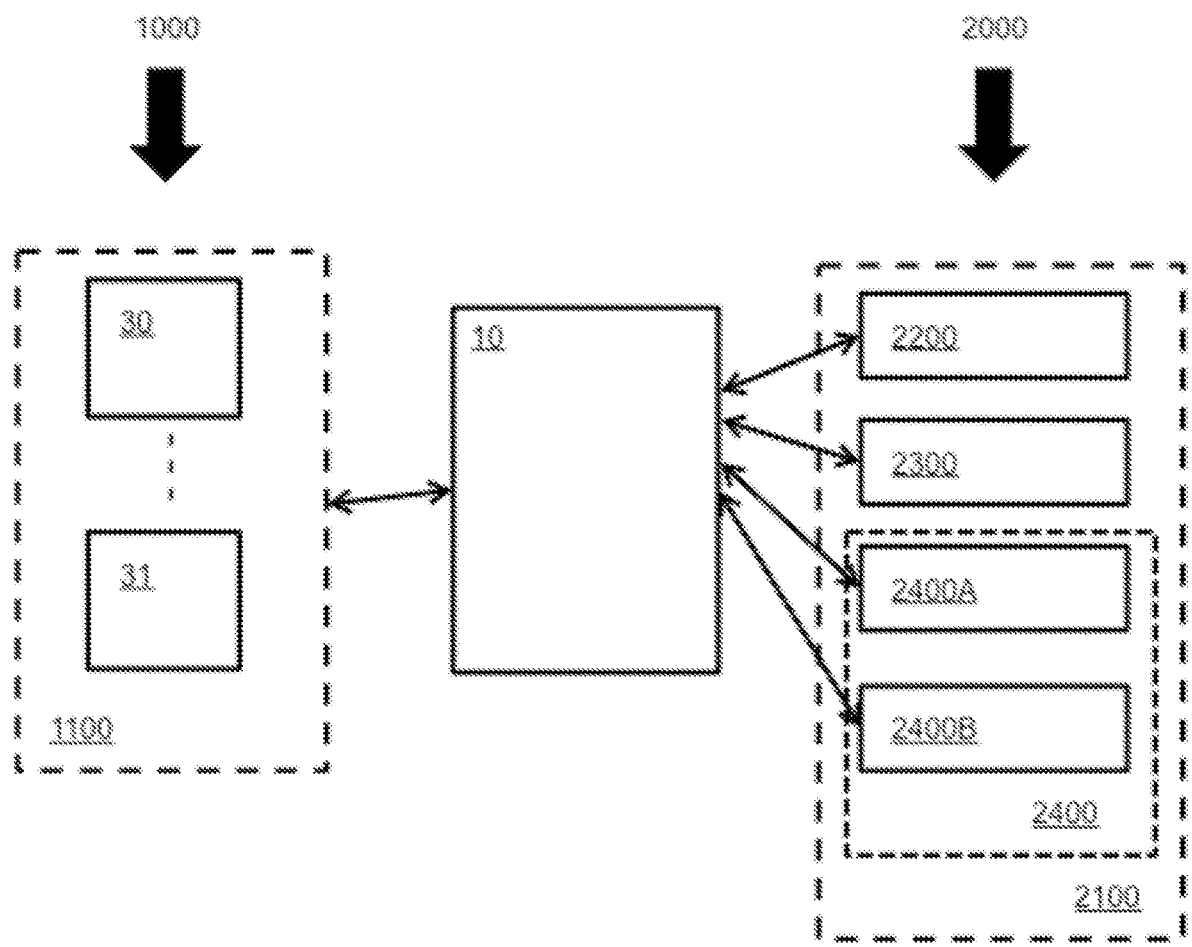
FIG. 1 is an illustration of an IBD device (information bridge device) according to a first embodiment of the present invention, arranged in co-operation with a user mobile device and a plurality of Enterprises.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing. Reference numerals are kept consistent throughout the set of figures, where a numeral refers to the same feature in several drawings.

When describing embodiments of the invention, it will be appreciated that the mobile device illustrated is, in fact, only one device available to a user. The user could equally access the provisions of the embodiments of the present invention from an alternative device with similar capabilities, such as a notebook computer, a desktop or laptop computer or other device capable of comprising and operating the APP functionality described.

The information bridge device (IBD) is here described and illustrated as an independent, free standing, device but this should not be considered as limiting. Implementation of embodiments of the present invention as e.g. distributed components or systems or processes, are possible.

FIG. 1 is an illustration of an IBD device 10 according to a first embodiment of the present invention, arranged in co-operation with a user 1000 mobile device 1100 and a plurality of Enterprise 2000 options 2100. The options 2200 2300 2400A and 2400B shown here do not necessarily belong to only one Enterprise but may be related to one or more Enterprises. Option 2200 here relates to an APP (application) related to the Enterprise 2000, such as a dedicated APP, option 2300 relates to a webportal and options 2400A and 2400B are different options comprised in a contact centre 2400, which itself may or may not be integral to the Enterprise 2000. These options 2100 are indicated for the purposes of illustration only and they should not be considered as limiting.

The user 1000 has arranged a plurality of n APP's (APP$_1$ 30 to APP$_n$ 31) on the mobile device 1100 which are dedicated to particular desired functionality and comprise different characteristics and ways of working, including the codes and processes used to communicate with other devices and applications. (This plurality of n APP's illustrated in the figure should not be considered as limiting, as only one APP is needed on the mobile device in order to facilitate use of any embodiment of the present invention). In principle, a plurality of users can interact with the IBD device, each user employing one or more APP's. Interactions between components, users and Enterprises are indicated by means of the arrows shown in the figure. Advantageously, the IBD 10 simplifies connection for the user by providing, in the least complex scenario, a single contact point between mobile device 1100 and IBD 10. The IBD 10 then assumes the responsibility for connection to the Enterprises 2000 or Enterprise options 2100 by means of one, or more, connections.

In the context of the present description, Enterprises are defined to comprise businesses or companies or other related entrepreneurial activities. Specifically, examples may comprise businesses of various sizes, government organisations, clubs, social networks, call centres etc.

The description concentrates on a single user 1000 connecting to or acquiring data from one or more Enterprise contact options 2100. However, this should not be considered as limiting. The IBD 10 20 according to embodiments of the present invention can facilitate, in parallel or sequentially (which can depend on the load on the device), connections between a plurality of users 1000 or Enterprise options 2100. Load balancing or prioritisation (of users or Enterprise options or Enterprises) can also be implemented, as desired.

Figure 2:
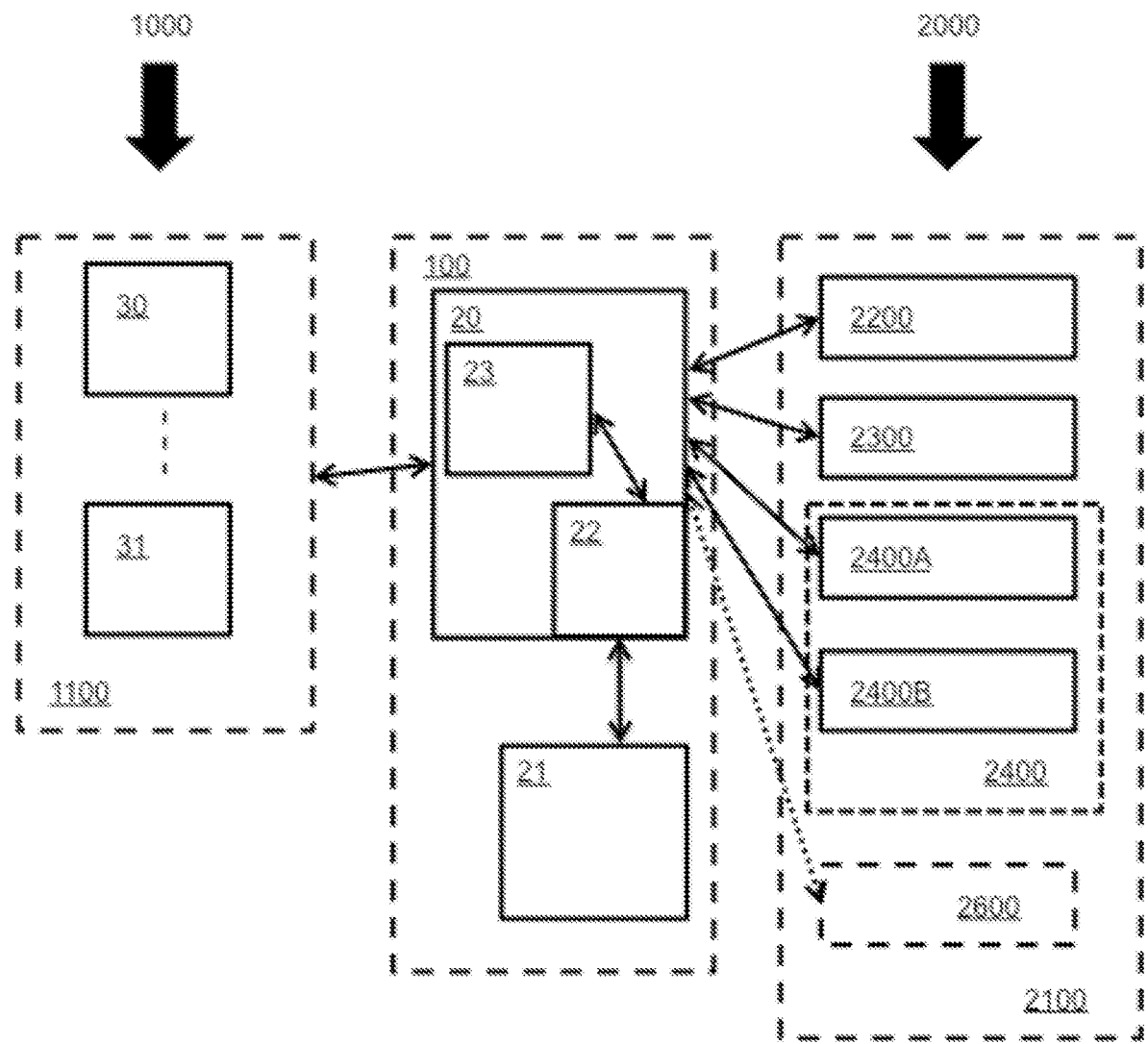
FIG. 2 is an illustration of an IBD device according to a second embodiment of the present invention, further comprising a programmable metadata store facilitated by means of an admin interface and an admin control, arranged in co-operation with a user mobile device and a plurality of Enterprises.

Referring to FIG. 2, which is an illustration of an IBD device 20 according to a second embodiment of the present invention further comprising a programmable metadata store (PMS) 23, facilitated by means of an Admin interface 22 and an Admin control 21, arranged in co-operation with a user mobile device and a plurality of Enterprises, the device 20 is further arranged in co-operation with an Admin Control 21 to form a system 100. The device 20 is identical in content and function to the device of the first embodiment but further comprises an Admin Interface 22 (arranged to facilitate the transfer of instruction and data between the Admin Control 21 and the device 20) and a programmable metadata store (PMS) 23. An advantage of the provisions of the IBD device 20 according to the second embodiment of the present invention is that additional interactions and connections to new Enterprises or additional Enterprise related options 2600 can be added by means of an update instruction from Admin Control 21 concerning data associated with one or more (existing or new) Enterprises to be added to the PMS (Programmable Metadata Store) 23. It should be noted that IBD device 20 is capable of operation and function without reference to the Admin Control 21, in which case the device 20 of the second embodiment acts and functions in the same manner as the device 10 of the first embodiment. The PMS 23 simply acts as a metadata store in this instance. When the device 20 of the second embodiment of the present invention is arranged in co-operation with an Admin Control to form a system 100, the additional programmable functionality of the PMS facilitates the amendment of the metadata store and thereby alters or extends or reduces the range or number of Enterprises accessible by the device to implement a method according to embodiments of the present invention.

In the context of the present description, 'metadata' comprises information relating to parameters associated with the Enterprise, or to variables which may be obtained from the Enterprise, either by active request of the IBD 10 20 in response to a user or by collection from the Enterprise itself which actively provides the information. A (non-exhaustive) list of examples comprises:

agents_available
language
product
skillset
priority
support_level
average_response_time
number_of_contacts
number_of_chats_active
chat_history
issue_history
number_of_past_chats
backend_action_type
backend_action_address
menu_option_chosen_count
session time
channel
attachment
mime_type
allow_callback
callback_number
queue_position The metadata, such as the examples shown above, may comprise names characterising the function of the data. For example, "language" is a parameter arranged to take several possible values or attributes, all of which describe the language in which the Enterprise provides information or expects input e.g. English.

Referring to FIG. 1 and FIG. 2, it should be noted that any of the APP's 30 31 located on the mobile device 1100 may poll to directly obtain information or data from the IBD 10 20 (not shown).

The following description refers predominantly to one APP 30 in order to further explain the embodiments of the present invention. This should not be considered as limiting, as a plurality of APP's 30 31 may be present on a user device (or devices), some or all of which may be suitable for the processes described.

FIG. 1 and FIG. 2 illustrate, schematically, the relationship between the user and user device with the IBD devices according to embodiments of the present invention and also the relationship between said IBD devices and the Enterprise(s). The IBD devices are independent of user and Enterprise but are arranged to be able to co-operate, communicate and gather information and instruction from user or Enterprise. The devices 10 20 are arranged capable of utilising known formats, codes, protocols means and processes to address the multiple needs of contact to, and interaction with, disparate and technically different and diverse APP's and/or Enterprises and/or Enterprise components. Encryption protocols can be, optionally, implemented as desired, comprised in embodiments of the present invention. This can relate to interaction between the IBD and the user, the IBD and the Enterprise (or contact options) or the intermediate communication stages comprised therein. At least part of the functionality required by the device 10 20 to access and interact with a plurality of platforms, optionally comprises use of, or interaction with, e.g. a Message Transfer System, as outlined in U.S. patent application Ser. No. 15/072,440 (Mar. 17, 2016) and international patent application PCT/IB2017/051548, also published as WO/2017/158558 A1.

The IBD devices 10 20 act as a bridge between user 1000 and Enterprise 2000 to facilitate optimal interaction for the user 1000 in terms of ease of process and ease of communication.

The IBD devices, associated components and methods, according to embodiments of the present invention, will now be described further in relation to FIG. 3(A to C) to FIG. 7.

Figure 3A:
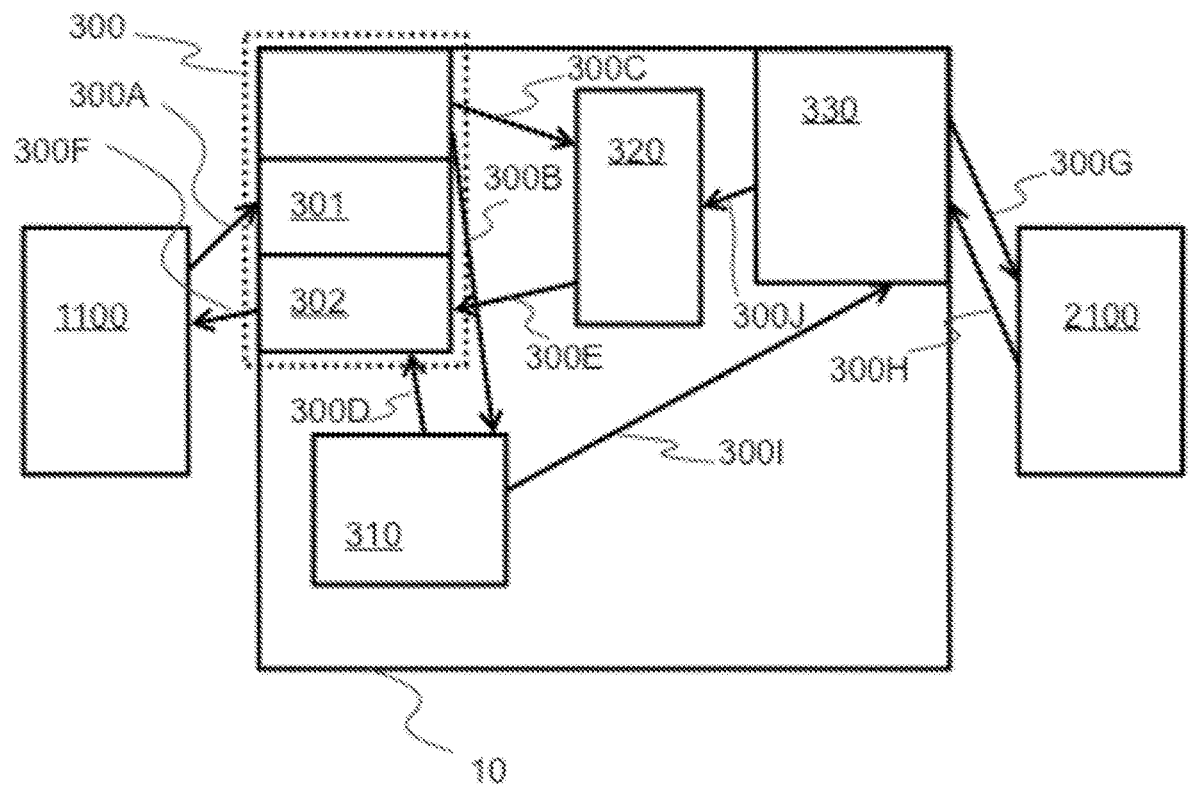
FIG. 3A is a further illustration of an IBD device according to the first embodiment of the present invention.

Referring now to FIG. 3A, which shows a further illustration of the IBD device according to the first embodiment of the present invention 10, the IBD is shown as comprising an API interface 300, which further comprises an API input 301, arranged to interact with at least one APP 30 (not shown) present on the mobile device 1100 of the user 1000. The APP 30 (not shown) could also be implemented as an application programming interface (API), dedicated to the user device, or as an Integration Point, said Integration Point being arranged to handle any kind of interaction the user device 1100 might have with a device 10 20 according to any embodiment of the present invention. The API interface 300 is arranged capable of interaction with multiple kinds of APP using a variety of known formats and protocols, as comprised in the current state of the art, as desired.

Via the API input 301, the user 1000 can optionally request specific information using the APP 30 present on his/her device 1100, as illustrated by arrow 300A. The API interface 300 is arranged co-operatively with a metadata store 310 and/or an Enterprise data store 320, as illustrated by arrows 300B 300C, respectively. The metadata store 310 comprises metadata related to one or more Enterprises, which the IBD 10 can access or contact or communicate with. Information relating to e.g. URL's associated with Enterprise contact options 2100 can be stored in the metadata store or e.g. a list of different Enterprises, optionally with order of preferential contact, can be placed there for reference. The Enterprise data store 320 comprises data derived from an Enterprise or Enterprise contact options 2100 by an Enterprise data collector 330, the function of which will be described below. Requested metadata or data is reverted to the API interface 300 or direct to an API output 302 by the metadata store 310 or Enterprise data store 320, respectively, for output to the user APP 30. This is illustrated by arrows 300D 300E 300F, respectively.

The Enterprise data collector 330 is arranged to interact with at least one Enterprise contact option 2100 (the metadata for which is present in the metadata store 310) to obtain at least one piece of information on that option which is useful to the user, as illustrated by arrow 300G 300H, respectively. The Enterprise contact option 2100 provides the Enterprise data collector 330 with information relevant to a user. The Enterprise data collector 330 receives this information, e.g. periodically as pre-defined, or actively engages, e.g. by polling, with the Enterprise contact option 2100. The Enterprise data is then stored in the Enterprise data store 320.

For example, Enterprise contact option 2100 in this figure can be regarded as a Contact Centre associated with a business, which the user wishes to contact. The Contact Centre may have multiple contact possibilities, such as web chat, voice call, text messaging. Each contact possibility will optionally be handled by different staff (optionally, present in independent locations or departments) and each contact possibility will have a particular service timing with respect to the user. A voice call may be subject to waiting time of several minutes, whereas a web chat may have no waiting time at all. Under the present state of the art, the user has no way of knowing what waiting time each contact possibility is subject to unless s/he attempts to make contact by each means, independently, to determine the current situation. By means of embodiments of the present invention, however, the Enterprise data collector, informed by information comprised in the metadata store (illustrated by arrow 3001) indicating the Enterprise and the various contact possibilities and how to access the possibilities, drives the collection of data relating to the Enterprise, in this case the waiting times, and retrieves at least one but preferably a plurality of relevant data information from the Enterprise contact option 2100. Said relevant data is passed to the Enterprise data store 320 (arrow 300J), thereby being available for transfer back to the user.

The Enterprise data collector 330 is optionally arranged to sample the required Enterprise information at a certain time, requested time interval, or predetermined time interval or rate.

The Enterprise data collector is preferentially arranged to drive the data collection process such that refresh and prompt update of date in the Enterprise data store can be automatically forwarded to refresh the information available on the user device. However another option is to arrange the operation such that the user makes a specific request via the APP 30 on their device to obtain the most recent refreshed information or to prompt the retrieval of fresh information.

Figure 3B:
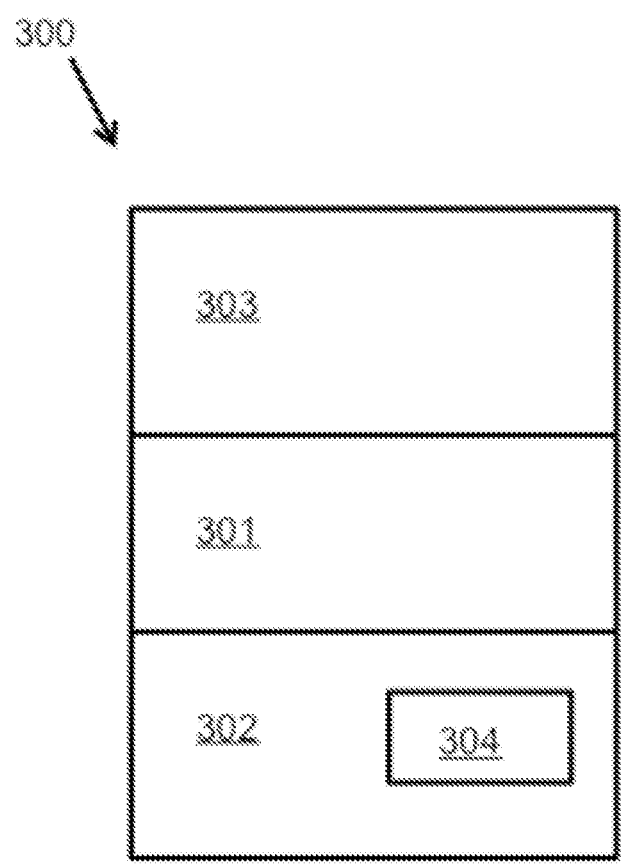
FIG. 3B is an illustration of the API interface of FIG. 3A.

Referring now to FIG. 3B, which comprises an illustration of the API interface 300, two sub-components of the API interface 300 are shown in addition to the API input 301 and API output 302, namely an IBD admin component 303 and a translator module 304. (The following description also refers to FIG. 3A for details of processing). The IBD admin component 303 facilitates processing of the user input or request from API input 301. Data requested can be obtained by means of a prompt illustrated by arrow 300C to Enterprise data store 320, where the latest information on various data (e.g. values or properties) has been placed following a polling enquiry conducted by the Enterprise data collector 330 (see later for details), or can be requested directly by fresh enquiry, via the metadata store 310 and Enterprise data collector 330 indicated by arrows 300B and 3001, to update the data present in Enterprise data store 320, arrow 300J. Data is transferred from the Enterprise data store 320 to the API output 302 (arrow 300E) and from there to the mobile device 1100 (arrow 300F).

Optionally, the API output 302 further comprises a translator module 304. The translator module 304 can be arranged to transmit information or data back to the mobile device 1100 in a specific, preferred or optimal format, depending on how the data to be viewed by the user 1000 is best presented or has been requested. For example, the translator module 304 can effect the translation by means of an intermediary JSON object, as outlined in U.S. patent application Ser. No. 15/072,440 (Mar. 17, 2016) and international patent application PCT/IB2017/051548, also published as WO/2017/158558 A1.

For data storage, it is preferred that the data comprise a JSON format. For output, JSON, HTML and XML are preferred. However, many formats may be used successfully in accordance with embodiments of the present invention.

Figure 3C:
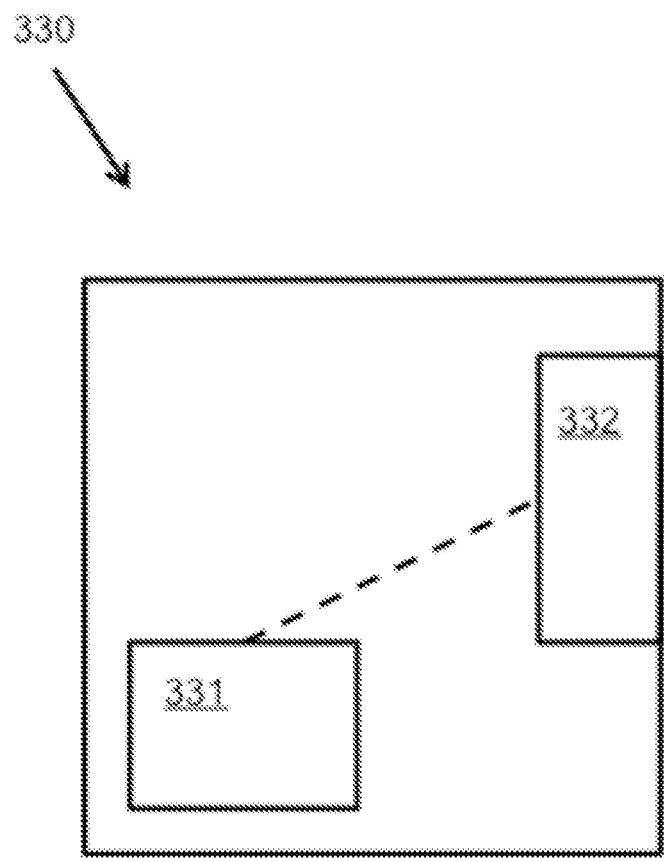
FIG. 3C is an illustration of the Enterprise data collector of FIG. 3A.

Referring now to FIG. 3C, which comprises an illustration of the Enterprise data collector 330, two sub-components comprised in the Enterprise data collector 330 are shown, namely a controller 331 and a tailored interface 332, which are arranged co-operative with each other.

Enterprise data controller 330 receives information (FIG. 3A, arrow 3001) from the metadata store 310 concerning a known list of Enterprises. The metadata comprises, for example, information about possible contact options for the Enterprise, access keys or passwords, special access points within the Enterprise system which may not be available to a casual visitor to the Enterprise system or communication language requirements, etc. This metadata is thus associated with an Enterprise which is already known to the IBD device, the association being based on a business arrangement where the Enterprise provides sufficient information (in advance) to allow set up of the information bridge device (IBD) 10 to facilitate proper access and information gathering by the IBD 10. The Enterprise information is stored in the metadata store 310 for use by the IBD 10. The metadata facilitates interaction between the IBD 10 and the Enterprise 2000, via the Enterprise contact options 2100.

Metadata relating to the Enterprise 2000, present in the metadata store 310 comprises information about the Enterprise, known in advance and used for Enterprise characterisation and access, which may be classed as 'static' information. In other words it is related to the acquisition and presentation of information, which comes from the Enterprise by polling, the latter being consequently regarded as 'dynamic' information.

The effect of this knowledge and set-up at the IBD side is to allow tailoring of the IBD connection to the Enterprise, according to what is available. The connection between the IBD and the Enterprise is facilitated in an automatic manner, thereby making a smoother information gathering process. This is akin to an "auto-identification" process, where the connection is made without further reference to the user. The set-up allows a secure connection between IBD and Enterprise which is also protective for the Enterprise in that a single entity is connected to the Enterprise system, as opposed to a plurality of individual user connections, and said connection has the potential to be made to a different part of the Enterprise system under different conditions to a direct user connection, if so desired. Alternatively, instead of making use of the metadata provided for connection, it is also possible for the IBD to connect by direct inquiry, if so desired. The connection is thus tailored to the Enterprise. In addition, the actual connection can be achieved such that specific software, exclusive to the IBD device 10, can be implemented if desired, to further enhance the security of the connection. The connection can be facilitated by http or other protocol and/or may be directed to a different interface of the Enterprise than that normally available to the rest of the world, possibly also not normally accessible to the user. A lower level interface of the Enterprise system could be used to expose types of information to the IBD 10 which creates a special gate or entry point. In the case of a contact centre system associated with the Enterprise, a dedicated application (API) could be provided for this purpose.

The information bridge device (IBD) 10, thus preferentially utlises pre-authorisation at the Enterprise side in order to be able to collect data on demand from the Enterprise. The IBD can facilitate this, thereby overcoming a technical barrier to the user, who would only be able to access information from the Enterprise one piece at a time, through disparate means. The user acting independently would not have the choice of accessing two or more options at once. At the same time, the Enterprise is protected as no unauthorised device can access the Enterprise information. The IBD 10 can thus obtain already published or public information or obtain information from the private resources of the Enterprise. Such information could then be arranged to comprise not only a choice of contact options but e.g. wait times with specific information on departments within the Enterprise, e.g. sales, billing, support, etc. all of which might have different wait times. In other words, a finer resolution of information on a specific request could be made available. This principle could also be applied to e.g. identification of availability of a specific operator, perhaps already know to the user and preferable for a follow up voice call, for example. The various embodiments of the present invention thus allow information to be obtained from the Enterprise 2000, which allows the user 1000 a free choice without multiple interactions.

Enterprise data collector 330 comprises a controller 331. The metadata input as described above is provided to this controller (from metadata store 310). The controller 331 is in communication with a tailored interface 332, also comprised in the Enterprise data collector 330, as shown in FIG. 3C. The controller 331 effects a polling of the Enterprise (which may be cyclical) for information, by means of the tailored interface 332, as based on the metadata received by user request and/or by automatic polling for specific information based on the metadata associated with the Enterprise itself. A user request can be arranged as a prompt for the IBD to immediately obtain (e.g. by polling) refreshed information from the Enterprise side, without reference to already stored (metadata) information. The exchange of information is illustrated in FIG. 3A by arrows 300G and 300H. The tailored interface 332 can be further arranged to effect parallel polling of different Enterprise attributes, can effect prioritised polling, can be arranged to poll based on a known Enterprise refresh rate or can be adjustable dependent on information returned from the Enterprise side, as controlled by the controller 331. The tailored interface 332 can allow or facilitate a characteristic connection to the Enterprise. The controller 331 may comprise a module running a particular type of software script, preferably Python script for optimised performance. The controller 331 can be arranged to assign a specific interaction or software process to each client Enterprise, for enhanced performance during operation.

Metadata also comprises input from the user 1000 via mobile device 1100. This is provided to the metadata store 310 from the API interface (more specifically from the IBD admin (administration) component 303, as illustrated by arrow 300E in FIG. 3A.

Important examples of metadata are:
attributes of a particular Enterprise e.g. wait time;
a property of a variable useful to the user 1000, e.g. useable to the user to achieve something;
facilitating or enabling information or data;
properties or information relevant to allow the user to make a decision or to allow a choice to be made;
descriptive data, a relevant subset of which is provided to the user, choice led by the IBD 10, which is already primed with information about the Enterprise and consequently already targets what options, e.g. streaming platform, call centre, etc., are available at the Enterprise side.

Having obtained the required information from the Enterprise 2000 by means of tailored interface 332, the data obtained is then transferred from the Enterprise data collector 330 to Enterprise data store 320, as indicated in FIG. 3A by arrow 300J. Optionally, the data obtained can be normalised to a preferred standard format for storage. It then becomes available for transfer to API 300 to be forwarded to the user 1000 by means of mobile device 1100.

An IBD 10 20 with static, unchanging, information comprised in the metadata store 310, is independent of further information or data being provided from the side of the Enterprise and operates based on the metadata as provided, without further update.

Figure 4:
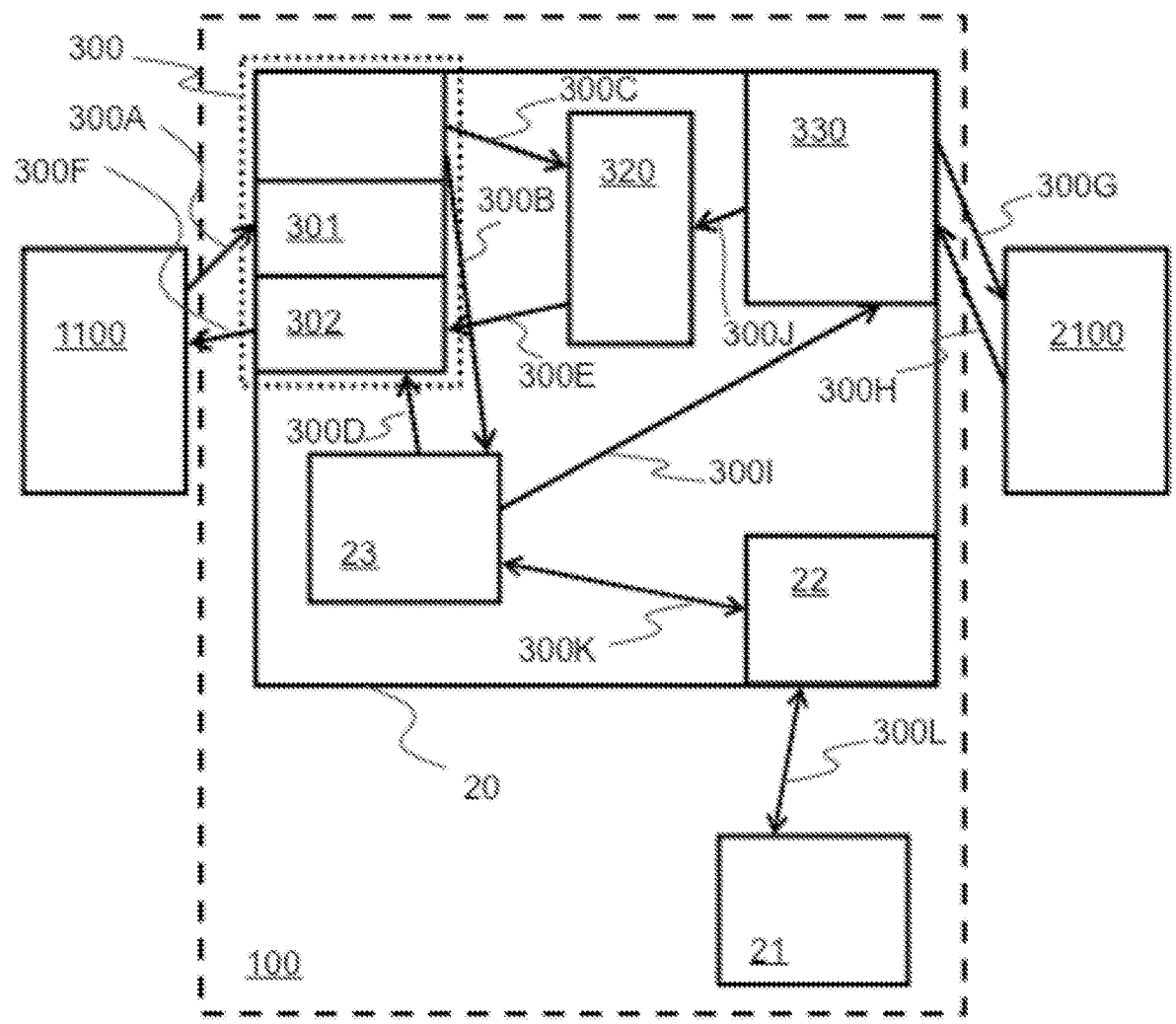
FIG. 4 is a further illustration of an IBD device according to the second embodiment of the present invention.

Referring now to FIG. 4, which shows a further illustration of the IBD device according to the second embodiment of the present invention 20, wherein the IBD 20 further comprises a programmable metadata store 23, in place of (as shown), or optionally additional to, a metadata store 310, and an Admin interface 22, arranged co-operatively with the programmable metadata store 23 (as illustrated by arrow 300K) and an Admin control 21 (as illustrated by arrow 300L). IBD device 20 is capable of operating independently of the Admin control 21, in a manner similar to IBD device 10, whereupon the Admin Interface 22 becomes (temporarily) redundant. The IBD device 20 is not required to be continually comprised in a system 100 with the Admin Control 21 but may be preferentially arranged thus, if so desired.

The API (application programming interface) 300 and Enterprise data collector 330, as described with reference to FIG. 3B and FIG. 3C, respectively, are also comprised in the device of FIG. 4, as shown.

Figure 5:
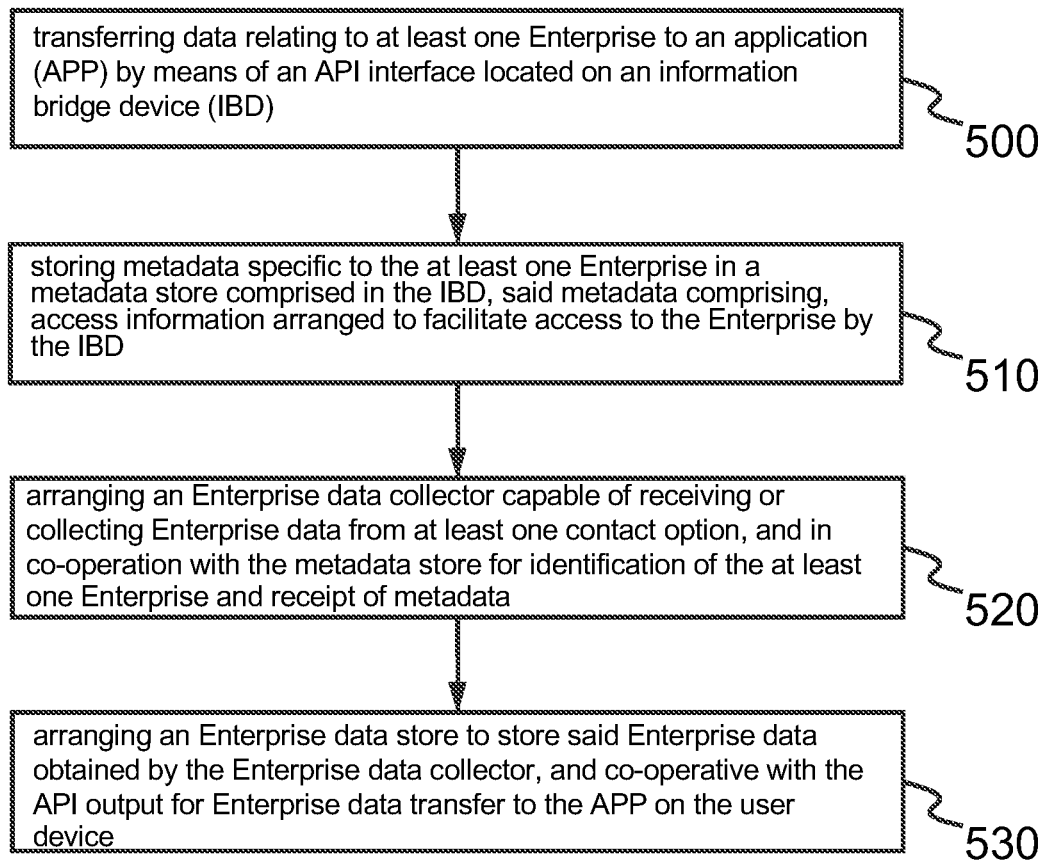
FIG. 5 is an illustration of steps of a method of employing the device of FIG. 3A.

Referring now to FIG. 5, FIG. 5 is an illustration of steps of a method of employing the device of FIG. 3A. The method comprises the steps of:
transferring 500 data 300F relating to at least one Enterprise 2000 to an application (APP) 30, arranged located on a user device 1100, by means of an API interface (application programming interface) 300 located on an information bridging device (IBD) 10 20 and comprising an API input 301 for receipt of user input or request via the application (APP) 30 and an API output 302 for facilitating transfer of data relating to the at least one Enterprise 2000;
storing 510 metadata specific to the at least one Enterprise 2000 in a metadata store 310 comprised in the IBD 10 20, said metadata comprising, access information arranged to facilitate access to the Enterprise 2000 by the information bridge (IBD) 10 20;
arranging 520 an Enterprise data collector 330, comprised in the IBD 10 20, capable of receiving or collecting 300G 300H Enterprise data from at least one contact option 2100 arranged in association with the at least one Enterprise 2000, and further arranging said Enterprise data collector 330 in co-operation with the metadata store 310 for identification of the at least one Enterprise 2000 and receipt of metadata comprising access information associated with the at least one contact option 2100 to facilitate collection; and,
arranging 530 an Enterprise data store 320, comprised in the IBD 10 20, to store said Enterprise data obtained by the Enterprise data collector 330, and further arranged co-operative 300E with the API output 302 of the API interface 300 for Enterprise data transfer to the application (APP) 30 on the user device 1100.

Figure 6:
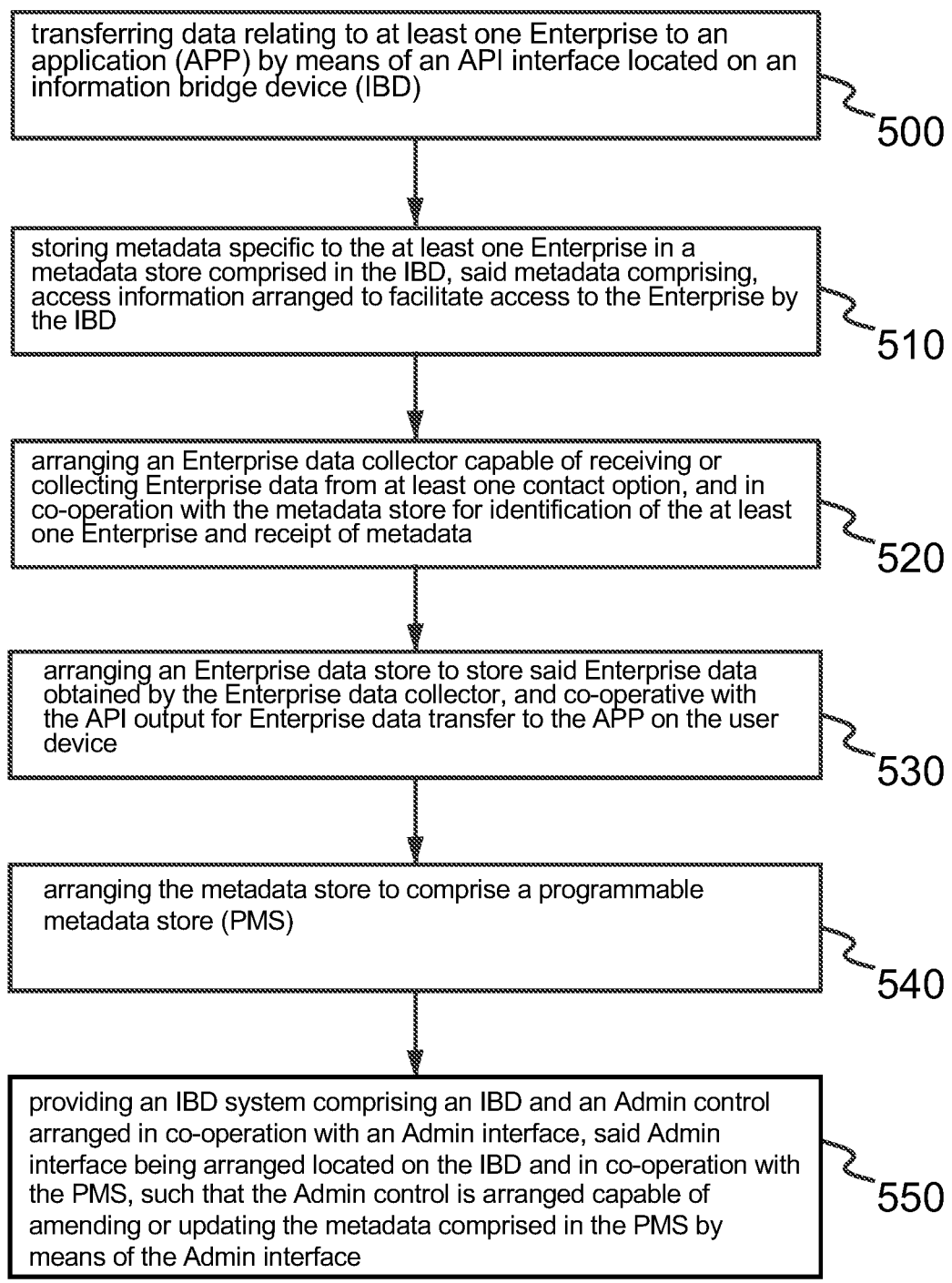
FIG. 6 is an illustration of steps of a preferred method of employing the device of FIG. 4, here introducing the concept of updates using the system comprising the admin control.

Referring now to FIG. 6, FIG. 6 is an illustration of steps of a preferred method of employing the device of FIG. 4, here introducing the concept of updates using the system comprising the admin control. The method comprises the steps of the method of FIGS. 5 500 to 530 plus the additional steps of:

arranging 540 the metadata store 310 to comprise a programmable metadata store, PMS 23.

providing 550 an information bridge system 100 comprising an information bridge device IBD 20, and further comprising an Admin control 21 arranged in co-operation with an Admin interface 22, said Admin interface 22 being arranged located on the information bridge device 20 and further arranged in co-operation with the PMS 23, such that the Admin control 21 is arranged capable of amending or updating the metadata comprised in the PMS 23 by means of the Admin interface 22.

Figure 7:
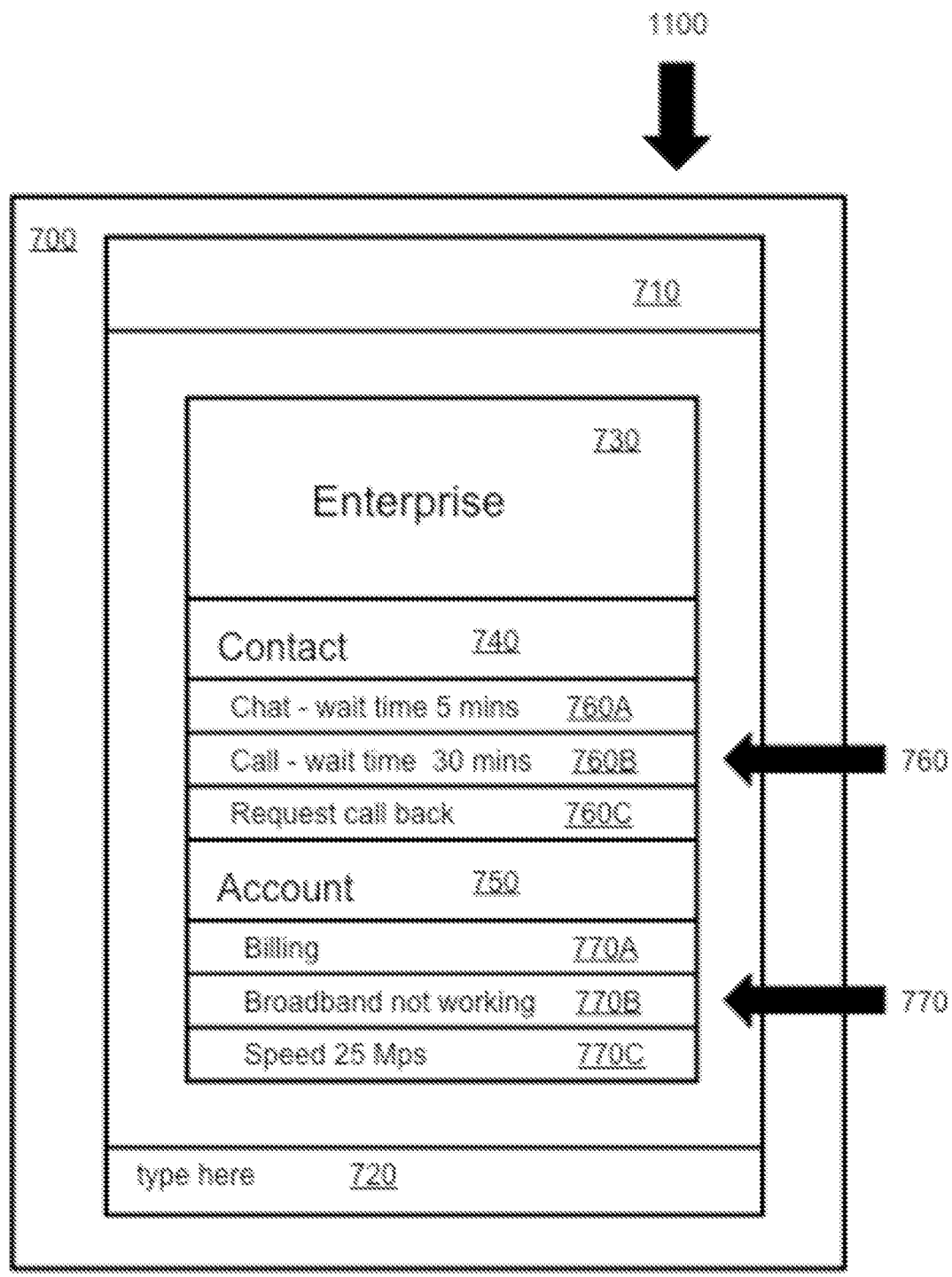
FIG. 7 is a schematic illustration of a Facebook user interface comprised in association with an APP and arranged capable of facilitating use of an IBD device according to an embodiment of the present invention.

Referring now to FIG. 7, FIG. 7 is a schematic illustration of a Facebook user interface comprised in association with an APP and arranged capable of facilitating use of an IBD device according to an embodiment of the present invention. The figure shows the user interface (UI) 700 of a user device 1100, here a mobile device such as a smart phone. A banner 710 across the top of the UI indicates that a Facebook APP is running on the device 1100. At the bottom of the UI a window 720 is provided for typed user inputs. The main section of the UI 700 comprises display based on a request from the user for information concerning a particular Enterprise 2000. The Enterprise name or logo or other identification information can be displayed in a middle section 730 of the UI, while the rest of the middle section is split between two headings 740 750 relating to Enterprise contact information and user account details, respectively.

Directly below the Enterprise contact information heading 740, buttons 760 provided by the Facebook APP are arranged dedicated to particular contact options, which are also present in the metadata store 23 310 of the IBD device and therefore available to the Enterprise data collector 330. Said collector 330 collects up to date information on the particular contact options, refreshes the Enterprise data store 320 from which the API interface 300 or API output 302 can transfer the data back to the APP 30 for use in the UI 700. Buttons 760 are illustrated in FIG. 7 as displaying Chat option and associated wait time 760A, Call option and associated wait time 760B, and a Request call back button 760C, respectively. Button 760C illustrates the option of inputting data or instruction to the IBD 10 20, from the APP 30, for inclusion in the metadata and thus action by the Enterprise data collector 330.

Similarly, additional buttons or windows displaying other information can be defined. In the example of FIG. 7, the user account heading 750 may be associated with buttons 770, comprising access to billing information 770A, information on broadband signal 770B and communication speed 770C.

The figure illustrates a preferred example of use of user interface 700 which should not be considered as limiting. The number of buttons, chosen information, etc., may comprise different numbers of features, rearrangement on the windows provided, different collected date and more without departing from the spirit of the various embodiments of the present invention. The user interface is described here in terms of Facebook (or Facebook Messenger) but this should not be considered as limiting. Other suitable interfaces, e.g. comprising Twitter, Apple Business Chat, Wechat, etc., are also susceptible for inclusion and are compatible with the embodiments of the present invention.

Figure 8:
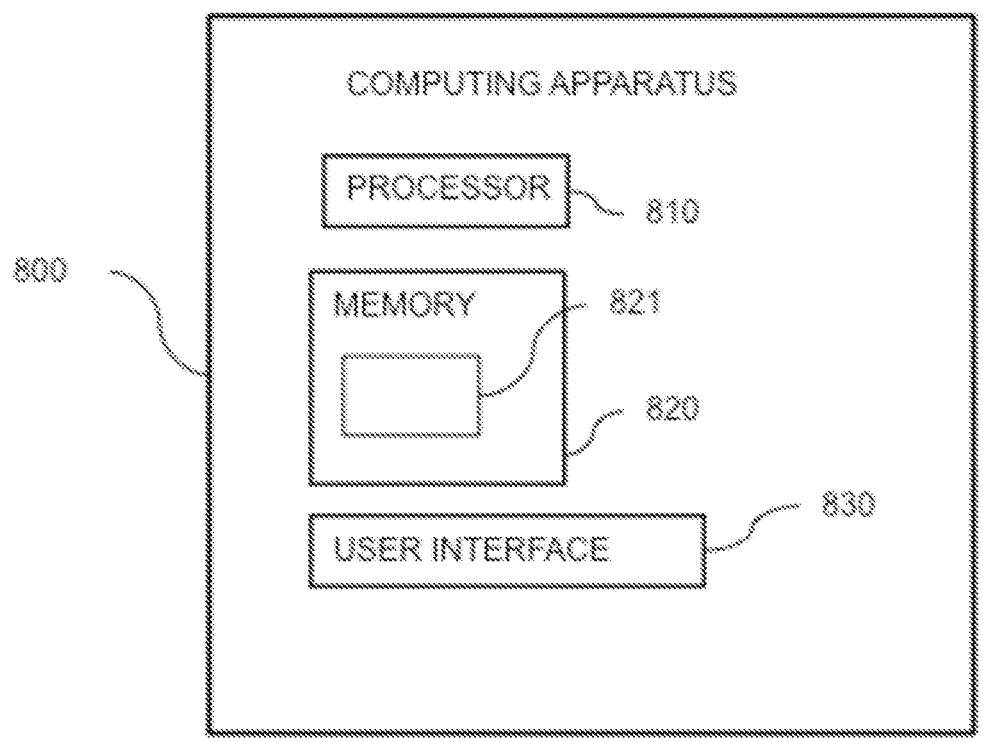
FIG. 8 is an illustration of a block diagram of a computing apparatus suitable for implementing and practicing aspects of the disclosed embodiments of the present invention.

Referring now to FIG. 8, FIG. 8 is an illustration of a block diagram of a computing apparatus 800 suitable for implementing and practicing aspects of the disclosed embodiments of the present invention. The computing apparatus 800 of FIG. 8 comprises a processor 810, a memory 820, optionally comprising computer readable program code 821, and further comprises a user interface 830.

FIG. 8 shows a block diagram of a computing apparatus 800 that may be used to practice aspects of the disclosed embodiments. For example, any of the devices, remote platforms and systems disclosed herein, alone or in any combination, may be implemented using the computing apparatus 800. The computing apparatus 800 may include computer readable program code 821 stored on at least one non-transitory computer readable medium 820 for carrying out and executing the process steps described herein. The computer readable medium 820 may be a memory of the computing apparatus 800. In alternate aspects, the computer readable program code may be stored in a memory external to, or remote from, the apparatus 800. The memory may include magnetic media, semiconductor media, optical media, or any media which is readable and executable by a computer. Computing apparatus 800 may also include a microprocessor 810 for executing the computer readable program code 821 stored on the at least one computer readable medium 820. In at least one aspect, computing apparatus may include one or more input or output devices, generally referred to as a user interface 830 which may operate to allow input to the computing apparatus 800 or to provide output from the computing apparatus 800.

Figure 9:
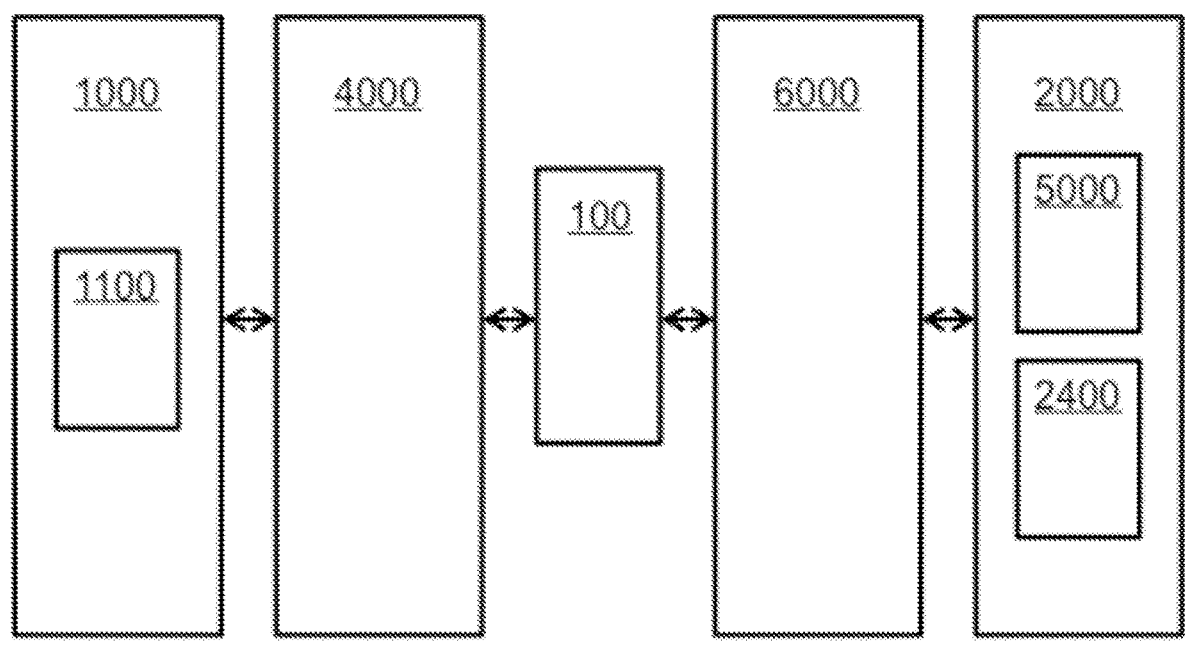
FIG. 9 is a schematic illustration of a contact centre ecosystem comprising an IBD device according to any embodiment of the present invention; and, FIG. 10 is a schematic illustration of a plurality of interactions effected between at least one user and at least one Enterprise, according to the state of the art.
Figure 10:
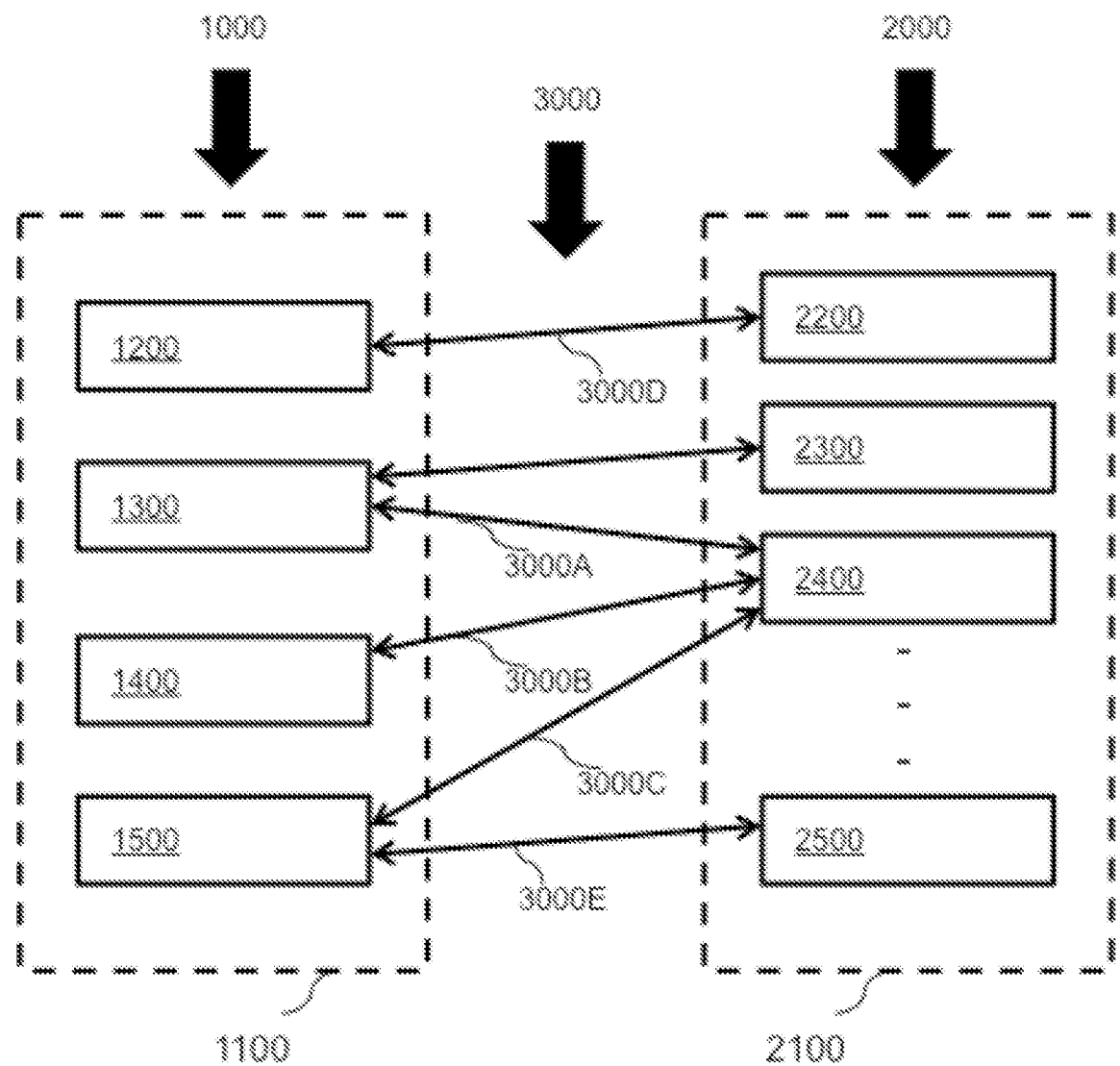

Referring now to FIG. 9, FIG. 9 is a schematic illustration of a contact centre ecosystem 900 comprising an IBD device 10 20 (not shown) or system 100 according to any embodiment of the present invention. Messaging user(s) 1000 such as users utilising at least one smart phone or other mobile device 1100 are provided messaging capability by means of messaging platforms 4000. Examples of messaging platforms include but are not limited to: SMS, MMS, Messenger, Google and/or Viber. The IBD device 10 20 (not shown) or system 100, according to any embodiment of the present invention, comprises functionality which permits interaction between the IBD device 10 20 (not shown) or system 100 and the various messaging platforms 4000 by means of established means, methods and protocols. At the Enterprise(s) 2000 side, chat and contact centre vendors 5000 provide at least one Enterprise contact centre 2400. Examples of chat and contact centre vendors 5000 include but are not limited to: Cisco, Avaya, eGain, Oracle and/or Salesforce. By means of integration partners 6000, which include but are not limited to Converge One, CDW, Dimension Data and/or Arrow, the Enterprise(s) contact centre(s) also interact with the IBD device 10 20 (not shown) or system 100, according to embodiments of the present invention by known means, methods and protocols. The integration partners 6000 may further comprise intermediary services (not shown) which may include but are not limited to AI systems, virtual agents and/or automated 'bot' services. The IBD device 10 20 or system 100 comprising the IBD device 10 20 thus form a bridge between the user 1000 and Enterprise 2000, providing additional value and functionality to the user 1000 as described above.

Although embodiments of the invention are described in the foregoing, it will be appreciated that the present invention is also susceptible to being implemented such that more than one IBD device according to any embodiment of the present invention is capable of being utilised in the manner discussed above simultaneously with another IBD device. Only a single IBD device is shown in the figures for clarity. Further, it should also be noted that the APP 30, located on the user device, is exemplary only. The APP 30 could also be implemented as an application programming interface (API), dedicated to the user device, or as an Integration Point, said Integration Point being arranged to handle any kind of interaction the user device 1100 might have with a device 10 20 according to any embodiment of the present invention.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

LIST OF REFERENCE NUMERALS

- 10 IBD device according to a first embodiment of the present invention
- 20 IBD device according to a second embodiment of the present invention
- 21 Admin control
- 22 Admin interface
- 23 programmable metadata store (PMS)
- 30 APP$_1$
- 31 APP$_n$
- 100 system comprising an IBD device according to a second embodiment of the present invention
- 300 API interface
  - 301 API input
  - 302 API output
  - 303 IBD admin component
  - 304 translator module
- 300A to 300L arrows indicating data or information transfer between components of the IBD device (10 20) or system (100)
- 310 metadata store
- 320 Enterprise data store
- 330 Enterprise data collector
  - 331 controller
  - 332 tailored interface
- 500 to 550 method steps
- 700 user interface UI
- 710 banner
- 720 window for user typed inputs
- 730 section of UI for Enterprise
- 740 section of UI for Enterprise contact details
- 750 section of UI for user account details
- 760 buttons 760A 760B 760C
- 770 buttons 770A 770B 770C
- 800 computing apparatus
- 810 processor
- 820 memory
  - 821 computer readable program code
- 830 user interface
- 900 contact centre ecosystem
- 1000 user
- 1100 mobile device
- 1200 dedicated Enterprise APP
- 1300 email
- 1400 SMS
- 1500 voice call
- 2000 Enterprise
- 2100 Enterprise contact options
  - 2200 dedicated Enterprise APP
  - 2300 webportal
  - 2400 Contact Centre
  - 2400A Contact Centre
  - 2400B Contact Centre
  - 2500 phone
  - 2600 option to be added
- 3000 arrows indicating interactions between user and Enterprise
- 3000A arrow email to Contact Centre
- 3000B arrow SMS to Contact Centre
- 3000C arrow voice call to Contact Centre
- 3000D arrow dedicated APP to dedicated APP
- 3000E arrow voice call to phone line
- 4000 messaging platforms
- 5000 chat and contact centre vendors
- 6000 integration partners or integration platform

The invention claimed is:

1. An information bridge device (IBD) configured to access and to interact with a plurality of Enterprises independently of a user, comprising:
   at least one processor adapted to:
      via an input to an application programming interface (API) executed by the at least one processor, receive a user input or request specifying an at least one Enterprise via an application (APP) stored on a user device associated with the user, and via an output from the API executed by the at least one processor, transfer data relating to the at least one Enterprise to the application, the at least one Enterprise being among the plurality of Enterprises with which the IBD is configured to access and interact independently of the user; and
      via an Enterprise data collector executed by the at least one processor:
         receive metadata identifying the at least one Enterprise from at least one memory configured as a metadata store,
         receive metadata comprising authorisation access information associated with at least one contact option of the at least one Enterprise based on the received metadata identifying the at least one Enterprise for connection of the IBD to said at least one contact option and for authorizing a connection between the IBD and the plurality of Enterprises, and
         receive or collect Enterprise data relevant to the user from the at least one contact option based on the received metadata comprising the authorisation access information; and
   the at least one memory configured:
      as the metadata store, adapted to store said metadata identifying the at least one Enterprise, and said metadata comprising authorisation access information,
      as an Enterprise data store, adapted to store said Enterprise data obtained by the Enterprise data collector, and
      to output the Enterprise data to the output from the API for transfer of the Enterprise data to the application (APP) stored on the user device,
   wherein the IBD is configured to maintain connection to the at least one contact option and to the user device, as a bridge between the at least one Enterprise and the user, such that the user interacts with the at least one Enterprise via the IBD, wherein the IBD is a single point of contact for the user for the plurality of Enterprises, and wherein the IBD is configured to interact independent of the user with at least one other contact option of the at least one Enterprise and/or at least one other of the plurality of Enterprises and/or at least one other user, at the same time.

2. The information bridge device (IBD) according to claim 1, wherein the processor is further adapted to, via the Enterprise data collector:

drive collection of said Enterprise data by a data collection process to facilitate refresh and prompt update of data in the at least one memory for automatic forwarding to the user device; and/or transfer the collected Enterprise data to refresh the at least one memory; and/or prompt output of the Enterprise data via the API to the application (APP).

3. The information bridge device (IBD), according to claim 1, wherein the processor is further adapted to, via the Enterprise data collector, collect said Enterprise data at a specific time or requested time interval, or at a predetermined interval or rate.

4. The information bridge device (IBD) according to claim 1, wherein the at least one memory is further arranged in co-operation with the API for data transfer of said stored metadata to the application (APP).

5. The information bridge device (IBD) according to claim 4, wherein data transferred to said application (APP) comprises transfer of said metadata or said Enterprise data.

6. The information bridge device (IBD) according to claim 1, wherein the at least one processor is further adapted to, via the input to the API, receive an optional request from the application (APP) for purposes of requesting said metadata or said Enterprise data.

7. The information bridge device (IBD) according to claim 1, wherein the at least one memory further comprises a programmable metadata store, adapted to store programmable metadata.

8. An information bridge system comprising:

the information bridge device (IBD) as claimed in claim 7; and an Admin control processor arranged in co-operation with an Admin interface of the information bridge device, and further arranged in co-operation with the at least one memory, such that the Admin control processor is adapted to amend or update the programmable metadata stored in the at least one memory via the Admin interface.

9. The information bridge system according to claim 8, being arranged in association with:

a messaging platform arranged to facilitate access to the application (APP) stored on the user device associated with said user, and/or;

an integration platform arranged to facilitate access to the at least one contact option arranged in association with the at least one Enterprise.

10. A communication system comprising the information bridge device (IBD) according to claim 1.

11. The communication system, according to claim 10, further comprising:

a messaging platform adapted to provide messaging capability to the user device associated with said user, and/or an integration platform adapted to contact center services to the at least one contact option arranged in association with the at least one Enterprise.

12. The information bridge device, according to claim 1, wherein the at least one processor is further adapted to:

via an IBD admin component of the API executed by the at least one processor, process the user input or request from the input to the API, and via a translator module component of the API executed by the at least one processor, transmit data or information to the user device in a specific, preferred, or optimal format.

13. The information bridge device, according to claim 12, wherein the translator module is configured to effect a translation by an intermediary JSON object.

14. The information bridge device, according to claim 1, wherein the at least one contact option comprises a dedicated application, a web portal, or a contact center, configured to provide text messaging, web chatting, emailing, or voice calling between the user and the corresponding at least one Enterprise.

15. The information bridge device, according to claim 14, wherein the at least one Enterprise comprises a business, government organization, or other entrepreneurial entity.

16. The information bridge device, according to claim 1, wherein the received or collected Enterprise data relevant to the user comprises a user wait time of the at least one contact option.

17. A method of information bridging, comprising the steps of:

receiving a user input or request specifying an at least one Enterprise via an application (APP) stored on a user device via an input of an application programming interface (API) executed by at least one processor of an information bridging device (IBD), the IBD being configured to access and to interact with a plurality of Enterprises independently of a user, and being a single point of contact for the user for the plurality of Enterprises;

identifying, via an Enterprise data collector executed by the at least one processor of the information bridge device (IBD), the at least one Enterprise among the plurality of Enterprises;

receiving, via the Enterprise data collector, metadata comprising authorisation access information associated with at least one contact option of the at least one Enterprise for connection of the IBD to said at least one contact option and for authorizing a connection between the IBD and the plurality of Enterprises;

storing said received metadata comprising the authorisation access information in at least one memory of the IBD;

receiving or collecting, via the Enterprise data collector, Enterprise data relevant to the user from the at least one contact option based on said metadata comprising the authorisation access information;

storing said Enterprise data obtained by the Enterprise data collector in the at least one memory;

transferring said Enterprise data to the application (APP) stored on the user device via an output of the application programming interface (API); and maintaining connection to the at least one contact option and to the user device, as a bridge between the at least one Enterprise and the user, such that the user interacts with the at least one Enterprise via the IBD, wherein the at least one memory storing said metadata comprising the authorisation access information is configured as a metadata store, and the at least one memory storing said Enterprise data is configured as an Enterprise data store.

18. A method of information bridging, as claimed in claim 17, further comprising the steps of:
- collecting, via the Enterprise data collector, said Enterprise data; and/or
- transferring, via the Enterprise data collector, the collected Enterprise data to refresh the at least one memory of the IBD; and/or
- prompting, via the Enterprise data collector, output of said Enterprise data via the API to the application (APP); and/or
- collecting, via the Enterprise data collector, said Enterprise data at a specific time or requested time interval or at a predetermined interval or rate; and/or
- receiving, via the API, an optional request from the at least one application (APP) for the purposes of requesting said metadata or said Enterprise data; and/or
- processing the user input or request and transmitting data or information to the user device in a specific, preferred, or optimal format; and/or
- effecting a translation for transmitting data or information to the user device by an intermediary JSON object; and/or
- wherein the at least one memory of the IBD is arranged in co-operation with the API for data transfer of said metadata or said Enterprise data to the application (APP); and/or
- wherein the at least one memory of the IBD is further adapted to comprise a programmable metadata store, adapted to store programmable metadata; and/or
- wherein the received or collected Enterprise data relevant to the user comprises a user wait time of the at least one contact option.

19. A method of information bridging, as claimed in claim 18, further comprising the step of:
- amending or updating the metadata stored in the at least one memory of the IBD via an Admin interface of the IBD, the Admin interface being arranged in co-operation with an Admin control processor and the at least one memory of the IBD.

20. The method according to claim 18, said collection of said Enterprise data being driven by a data collection process to facilitate refresh and prompt update of data in the Enterprise data store for automatic forwarding to the user device.

21. The method according to claim 18, said stored metadata comprising metadata comprising at least one URL for connection to the at least one Enterprise or a list of a plurality of Enterprises, and the metadata associated with each of said plurality of Enterprises or at least one contact option.

22. A non-transitory computer-readable medium having instructions stored thereon that, when executed by a processor, cause the processor to execute the steps of the method according to claim 13.

* * * * *